P. KISH.
COMBINATION STEERING WHEEL LOCK.
APPLICATION FILED AUG. 13, 1921.
1,428,963.
Patented Sept. 12, 1922.
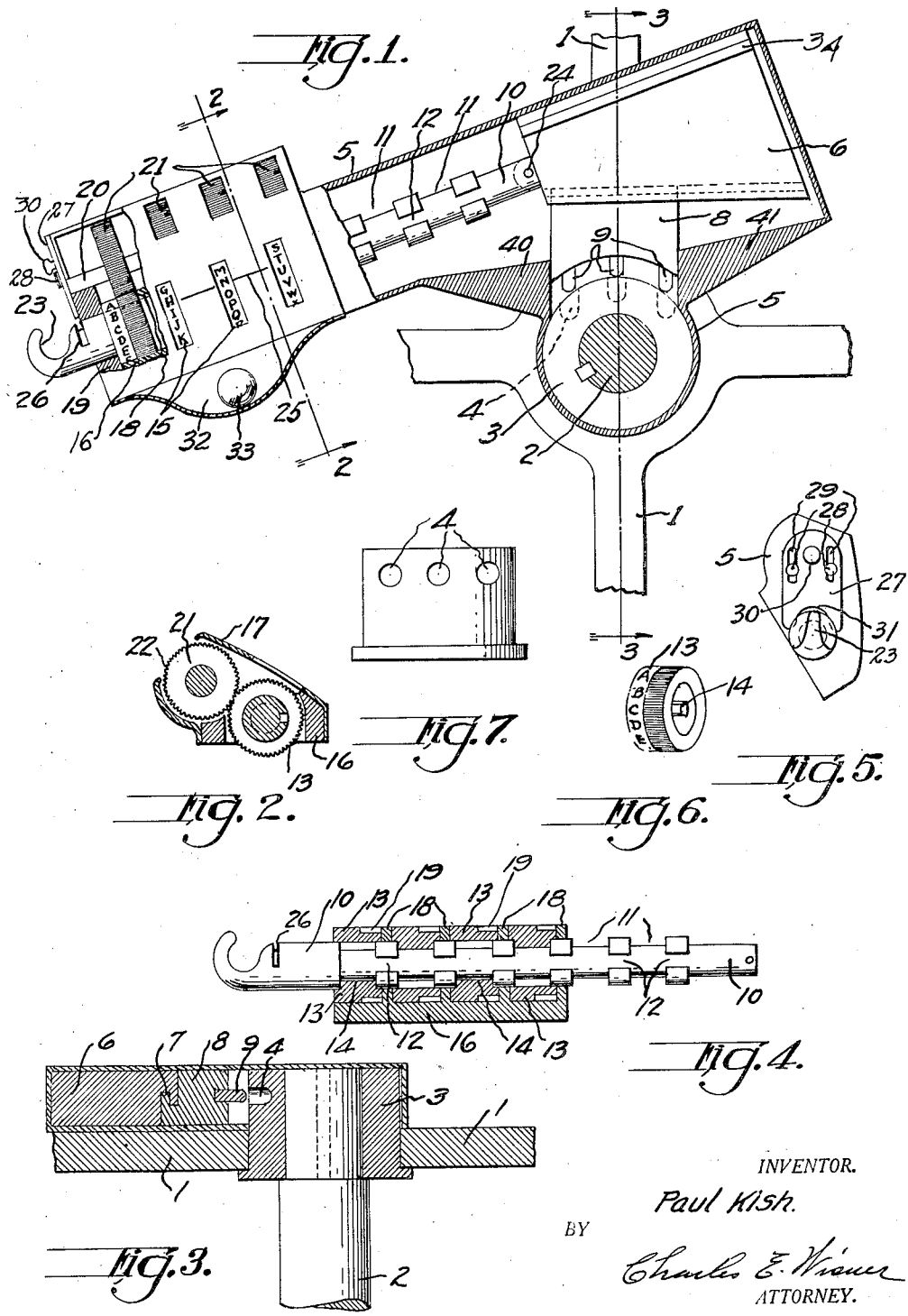
INVENTOR.
Paul Kish.
BY
Charles E. Wisner
ATTORNEY.

Patented Sept. 12, 1922.

1,428,963

UNITED STATES PATENT OFFICE.

PAUL KISH, OF DETROIT, MICHIGAN.

COMBINATION STEERING-WHEEL LOCK.

Application filed August 13, 1921. Serial No. 491,966.

*To all whom it may concern:*

Be it known that I, PAUL KISH, a subject of the King of Great Britain, residing at Detroit, county of Wayne, State of Michigan, have invented a certain new and useful Improvement in Combination Steering-Wheel Locks, and declare the following to be a full, clear, and exact description of the same, such as will enable others skilled in the art to which it pertains to make and use the same, reference being had to the accompanying drawings, which form a part of this specification.

This invention relates to combination steering wheel locks and the object of the invention is to provide a combination steering wheel lock adapted to lock the steering wheel of an automobile to rotate about the steering shaft and also adapted to lock the steering wheel to rotate with the steering shaft. This invention utilizes a bolt and permutation tumblers similar to those shown in my United States Patent Number 1,325,-641 entitled Permutation bolt locks and issued December 23, 1919. A further object of the invention is to provide a combination steering wheel lock comprising a series of permutation tumblers rotatable on a bolt, any one of which is adapted to prevent longitudinal movement of the bolt in the case but, when all are properly, relatively arranged, allows movement of the bolt longitudinally in either direction to lock the steering wheel to rotate with the shaft or to lock the steering wheel to rotate about the shaft. Another object of the invention is to provide a simple and efficient lock of the character stated that is comparatively inexpensive to manufacturers and so constructed and arranged as to prevent the lock from being opened through the sense of feeling to determine the position of the permutation tumblers relative to the lock. A further object of the invention is to provide a latch on the outside of the casing which, when the permutation tumblers are properly relatively arranged to allow movement of the bolt in either direction to lock or unlock the steering wheel, may be engaged in an arcuate groove in the bolt to lock the device without moving the permutation tumblers out of the proper relative position for unlocking. These objects and the several novel features of the invention in its preferred form are hereinafter more fully described and claimed and the preferred form of construction by which these objects are attained is shown by the accompanying drawings in which—

Fig. 1 is a view of the lock, portions of the casing being broken away to show the construction.

Fig. 2 is a section taken on line 2—2 of Fig. 1.

Fig. 3 is a section taken on line 3—3 of Fig. 1.

Fig. 4 is a view of the bolt showing the permutation elements in section thereon.

Fig. 5 is a view of the end of the casing.

Fig. 6 is a perspective view of one of the permutation elements.

Fig. 7 is a face view of the annular locking member which is keyed to the steering shaft.

As shown in Fig. 1 a steering wheel 1 is provided which is rotatably mounted on an annular member 3 on the upper end of the steering shaft 2. The steering shaft 2 which is rotatably mounted in the steering column is keyed to the annular member 3 which is provided with a series of recesses 4 in the periphery thereof as shown more particularly in Figs. 1 and 7. Secured to or formed integrally with the hub of the steering wheel is a casing 5 which extends about the annular member 3 and also forms a casing for the lock. A block 6 shown more particularly in Figs. 1 and 3 is slidably mounted in the casing 5 and is provided with a groove at the edge in which the rib 7 of the locking block 8 is adapted to ride as shown in Fig. 3. The face of the lock block 8 is curved to fit the curve of the annular member 3 and the block is provided with a series of pins 9 adapted to engage in the apertures 4 in the member 3. It can thus be seen that by moving the wedge block 6 to the left of Fig. 1 the block 8 is moved downwardly causing the pins 9 to engage in the recesses 4 thereby locking the wheel to rotate with the steering shaft so that the operator may drive the car and, by returning the block 6 to the position shown in Fig. 1 the pins 9 on the block 8 are withdrawn from the apertures 4 thereby allowing free rotation of the steering wheel about the steering shaft. The casing 5 as shown in Fig. 1 is provided with solid portions 40 and 41 which provide guideways in which the block 8 may slide. The bolt 10 as will be readily seen from Figs. 1 and 4 is provided with a series of circumferential grooves 11 and a longitudinal groove 12 extending practically full length of the bolt opening into and of the same depth as the circumferential grooves in the bolt. The permutation tumblers 13 are cylindrical in form as shown in Fig. 6 and are provided with a series of letters on the outer face thereof and each tumbler is provided with an internal lug 14 projecting into the central aperture of the tumbler to a distance substantially or nearly equal to the depth of the grooves 11 and 12, the lugs being less in length than the length of the tumbler so that when the bolt is positioned as shown in Fig. 4 for instance the edges of the tumblers 13 ride on the larger portions of the bolt and completely cover the respective circumferential grooves and prevent observation thereof through the slots of the casing whereby the position of the lug on any tumbler cannot be seen from the exterior. As will be understood from Fig. 4 the lug 14 rides in the circumferential groove 11 allowing the tumblers 13 to be freely rotated on the bolt and the lug 14 of each tumbler is positioned relative to a predetermined letter on the face thereof. As will be noted from Fig. 2 the casing is formed to provide a member 16 to which the cover member 17 may be secured and this member 16 as shown in Fig. 4 is provided with a series of apertured spacing walls 18 formed integrally therewith and which prevent the permutation tumblers 13 from moving longitudinally with the bolt when the bolt is drawn therethrough, the end wall 19 of the casing as shown in Fig. 1 also preventing movement of the permutation tumblers when the bolt is drawn out. As shown more particularly in Figs. 1, 2, 4, and 6 the permutation tumblers 13 are each formed with teeth 19 to provide a gear and as shown in Fig. 1 a shaft 29 is mounted in the casing on which a series of gears 21 are rotatably mounted, each gear meshing with the teeth of one of the permutation tumblers. The cover 17 is provided with a series of slots 22 through which the edges of the gears 21 are exposed so that the said gears may be rotated separately by hand to rotate the different permutation tumblers. The bolt 10 at the end opposite the hook end 23 is secured by pin 24 to a lug on the portion 6 so that by pulling on the hook 23 the bolt and portion 6 are moved longitudinally of the casing 5.

The device shown in Fig. 1 is in the locked position, that is, the steering wheel may be rotated without rotating the steering shaft. To unlock the device or secure the steering wheel so that the steering shaft is rotated thereby the operator turns the first of the series of gears 21 to position the letter B of the first permutation tumbler in alignment with a line 25 on the casing at which time the second gear may be rotated to position the letter A on the second permutation tumbler in alignment with the line 25, this position of the tumblers positioning the lugs 14 thereon in alignment with the longitudinal grooves 12. At this time the third gear 21 may be turned to position the letter C of the third permutation tumbler in alignment with the line 25 and the fourth permutation tumbler is positioned with the letter K in alignment with the said line 25 at which time the lugs 14 are all in alignment with the groove 12 and by pulling on the hook end 23 the bolt may be drawn to the left of Fig. 1 which moves the wedge block 6 to the left and forces the pins 9 into the recesses 4 thereby locking the steering wheel to the steering shaft as hereinbefore described. This movement of the bolt positions the circumferential groove 11 at the right end of the bolt beneath the permutation tumblers 13 at which time the gears 21 may be rotated to turn the lugs 14 of the permutation tumblers out of alignment with the slot 12 thus locking the parts in position with the steering wheel locked to rotate the steering shaft 2. For the purpose of demonstration I have used the word "Back" but it will be understood that any combination of letters or four lettered word may be used for the combination depending upon the position of lugs 14 in relation to the letters on the permutation tumblers. It sometimes occurs that the driver wishes to leave his car and does not wish to take the time to operate the combination. For this purpose an arcuate slot 26 is provided in the outer end of the bolt and a plate 27 is slidably mounted on a pair of pins 28 on the end of the casing 5 as shown in Fig. 5. This plate 27 is provided with slots 29 for the pins 28 and is also provided with a knob 30 for sliding the same, the lower edge 31 of the plate 47 being arcuate in form to fit in the arcuate slot 26 in the bolt 10. With this device, when the driver wishes to drive his car, he unlocks the bolt and draws it forward which forces the pins 9 into the recess 4 thus locking the steering wheel to the steering shaft in the driving position. To prevent the necessity of locking the bolt in the outdrawn position with the parts in driving engagement the member 27 is provided and by pushing downward on the knob 30 the edge 31 of the member 27 is moved into one of the slots 11 of the bolt 10. This prevents return of the bolt so that the pins cannot be disengaged from the driving position by movement of the bolt to the right of Fig. 1. When the driver again wishes to leave the car he merely lifts the plate 27 out of engagement with the slot 11 and moves the bolt toward the right of Fig. 1 which withdraws the pins 9 from engagement in the recesses 4 at which time the permutation tumblers may be turned to lock the bolt with the parts out of driving engagement. As will be seen from Fig. 1 the block 6 is provided with a rib 34 which is adapted to ride in a groove provided therefor in the top of the lock casing the said groove preventing sidewise movement of the block 6. As shown in Fig. 7 the casing 17 may be provided with a flange 32 on which is mounted a small electric bulb 33 adapted at night to illuminate the lettered faces of the permutation tumblers so that the operator may see the combination.

From the foregoing description it becomes evident that the device is very simple and efficient in operation, cannot be operated by the sense of feeling and remains locked even though the lug of only one permutation tumbler is out of alignment with the slot 12, will not easily get out of order and provides a device which accomplishes the objects described.

Having thus fully described my invention its utility and mode of operation what I claim and desire to scure by Letters Patent of the United States is—

1. In a combination steering wheel lock for automotive vehicles, a steering shaft, an annular member secured thereto having a series of recesses in the outer cylindrical face thereof, a steering wheel rotatably mounted on the said annular member, a lock casing secured to the steering wheel, a locking block provided with a tongue and having a series of pins protruding therefrom adapted to engage in the recess of the annular member, a wedge block having a groove at an angle to the longitudinal axis thereof for receiving the tongue of the locking block, the arrangement being such that movement of the wedge block in one direction moves the locking block and pins into engagement with the recesses of the annular member and movement of the wedge block in the opposite direction withdraws the pins from the said recesses, a bolt connected to the wedge block and movable longitudinally in the casing to move the wedge block in one direction or the other and means for locking the bolt with the pins in or out of engagement with the said recesses.

2. In a combination steering wheel lock for automotive vehicles, a steering shaft, an annular member secured thereto having a series of recesses in the outer cylindrical face thereof, a steering wheel rotatably mounted on the said annular member, a lock casing secured to the steering wheel, a locking block having a series of pins protruding therefrom and adapted to engage in the recesses of the annular member, the said locking block being provided with a tongue, a wedge block provided with a groove for receiving the said tongue, a bolt secured to the wedge block having a protruding hook end and movable longitudinally in one direction or the other to move the wedge block, the arrangement being such that movement of the wedge block in one direction or the other moves the locking block and pins into or out of engagement with the recesses of the annular member and means for locking the bolt with the pins in or out of engagement with the said recesses.

3. In a combination steering wheel lock for automotive vehicles, a steering shaft, an annular member keyed thereto having a series of recesses in the outer cylindrical face thereof, a steering wheel rotatably mounted on the said annular member, a lock casing secured to the steering wheel, a locking block having a series of pins in the face thereof adapted to engage in the recesses of the annular member, a bolt movable longitudinally in the casing, a series of permutation tumblers rotatably mounted on the bolt and adapted to lock the bolt from longitudinal movement and means carried by the bolt for moving the locking block and pins into or out of engagement with the recesses in the annular member upon movement of the bolt longitudinally in one direction or the other.

In testimony whereof, I sign this specification.

PAUL KISH.